United States Patent
Mondello et al.

(10) Patent No.: US 12,362,915 B2
(45) Date of Patent: *Jul. 15, 2025

(54) SECURE VEHICULAR COMMUNICATION

(71) Applicant: Micron Technology, Inc., Boise, ID (US)

(72) Inventors: Antonino Mondello, Messina (IT); Michelangelo Pisasale, Catania (IT); Alberto Troia, Munich (DE)

(73) Assignee: Micron Technology, Inc., Boise, ID (US)

( * ) Notice: Subject to any disclaimer, the term of this patent is extended or adjusted under 35 U.S.C. 154(b) by 271 days.

This patent is subject to a terminal disclaimer.

(21) Appl. No.: 17/361,036

(22) Filed: Jun. 28, 2021

(65) Prior Publication Data
US 2021/0328781 A1    Oct. 21, 2021

Related U.S. Application Data (63) Continuation of application No. 16/034,763, filed on Jul. 13, 2018, now Pat. No. 11,050,556.

(51) Int. Cl.
*H04L 9/08* (2006.01)
*G06K 19/07* (2006.01)
(Continued)

(52) U.S. Cl.
CPC ........ *H04L 9/0825* (2013.01); *G06K 19/0723* (2013.01); *G07C 5/008* (2013.01);
(Continued)

(58) Field of Classification Search
CPC ... H04L 9/0825; H04L 9/0866; H04L 9/3265; H04L 9/3247; H04L 9/3263;
(Continued)

(56) References Cited

U.S. PATENT DOCUMENTS

7,557,731 B2    7/2009    Ramasubbu
8,526,606 B2    9/2013    Muthaiah
(Continued)

FOREIGN PATENT DOCUMENTS

CN    101903920 A   * 12/2010   ........... G07B 15/063
CN    105531747 A   *  4/2016   ............. G08G 1/091
(Continued)

OTHER PUBLICATIONS

Trupil Limbasiya and Debasis Das, "Secure Message Transmission Algorithm for Vehicle to Vehicle (V2V) Communication", Nov. 22, 2016, IEEE, 6 Pages.*
(Continued)

*Primary Examiner* — Ali H. Cheema
(74) *Attorney, Agent, or Firm* — Brooks, Cameron & Huebsch, PLLC (57) ABSTRACT

An apparatus can include a processor and a vehicular communication component. The vehicular communication component can be configured to generate a vehicular private key and a vehicular public key, provide the vehicular public key to a plurality of external communication components wherein each respective one of the plurality of external communication components is positioned on a different transportation assistance entity, provide data to at least one of the plurality of external communication components, receive, in response to providing the data, additional data from the at least one of the plurality of external communication components, wherein the additional data is encrypted using the vehicular public key, and decrypt the additional data using the vehicular private key.

16 Claims, 7 Drawing Sheets

(51) Int. Cl.
*G07C 5/00* (2006.01)
*G08G 1/0967* (2006.01)
*H04L 9/32* (2006.01)
*H04W 4/40* (2018.01)
*H04W 4/44* (2018.01)
*H04W 4/46* (2018.01)
*H04W 12/041* (2021.01)

(52) U.S. Cl.
CPC . *G08G 1/096783* (2013.01); *G08G 1/096791* (2013.01); *H04L 9/3247* (2013.01); *H04L 9/3265* (2013.01); *H04L 2209/805* (2013.01); *H04L 2209/84* (2013.01); *H04W 4/40* (2018.02); *H04W 4/44* (2018.02); *H04W 4/46* (2018.02); *H04W 12/041* (2021.01)

(58) Field of Classification Search
CPC ........................ H04L 2209/84; G06K 19/0723; G07C 5/008; G08G 1/096783; G08G 1/096791; G08G 1/096758; G08G 1/0965; H04W 12/033; H04W 12/041; H04W 12/108; H04W 4/023; H04W 4/44; H04W 4/46; H04W 4/80
USPC ............................................................. 380/270
See application file for complete search history.

(56) References Cited

U.S. PATENT DOCUMENTS

| | | | |
|---|---|---|---|
| 9,103,671 B1 | 8/2015 | Breed | |
| 9,679,487 B1* | 6/2017 | Hayward | G06Q 40/08 |
| 10,217,357 B1 | 2/2019 | Elsheemy | |
| 2004/0185842 A1 | 9/2004 | Spaur | |
| 2006/0174106 A1 | 8/2006 | Bell | |
| 2007/0063824 A1* | 3/2007 | Gaddy | G08G 1/096783 |
| | | | 340/426.21 |
| 2009/0027176 A1 | 1/2009 | Yulevich | |
| 2009/0115638 A1* | 5/2009 | Shankwitz | G08G 1/0104 |
| | | | 340/988 |
| 2009/0249074 A1 | 10/2009 | Madhavan | |
| 2010/0019937 A1 | 1/2010 | Mori | |
| 2010/0202616 A1 | 8/2010 | Peirce | |
| 2011/0148659 A1* | 6/2011 | Ueno | G08G 1/09675 |
| | | | 340/905 |
| 2011/0208387 A1* | 8/2011 | Bosch | G07C 5/085 |
| | | | 701/33.4 |
| 2011/0224892 A1* | 9/2011 | Speiser | G08G 1/01 |
| | | | 701/118 |
| 2011/0279251 A1 | 11/2011 | Yamada | |
| 2012/0086582 A1* | 4/2012 | Durekovic | G08G 1/161 |
| | | | 706/46 |
| 2012/0098657 A1 | 4/2012 | Bogatine | |
| 2012/0155636 A1* | 6/2012 | Muthaiah | H04L 9/0825 |
| | | | 380/44 |
| 2012/0202495 A1 | 8/2012 | Gehlen | |
| 2012/0249343 A1 | 10/2012 | Thomas | |
| 2013/0006464 A1* | 1/2013 | Speiser | G08G 1/096844 |
| | | | 701/25 |
| 2013/0067220 A1* | 3/2013 | Ando | H04W 4/44 |
| | | | 713/156 |
| 2013/0141251 A1 | 6/2013 | Sims | |
| 2013/0173112 A1 | 7/2013 | Takahashi et al. | |
| 2013/0184987 A1* | 7/2013 | Armitage | G08G 1/163 |
| | | | 701/454 |
| 2013/0279392 A1* | 10/2013 | Rubin | H04W 4/12 |
| | | | 370/312 |
| 2013/0279695 A1* | 10/2013 | Rubin | G08G 1/0969 |
| | | | 380/255 |
| 2013/0293394 A1* | 11/2013 | Rubin | H04L 5/0091 |
| | | | 340/902 |
| 2013/0342333 A1* | 12/2013 | Hutchings | G08B 13/19647 |
| | | | 348/148 |
| 2014/0020098 A1 | 1/2014 | Stalin | |
| 2014/0172287 A1 | 6/2014 | Ando | |
| 2014/0316635 A1 | 10/2014 | Bando | |
| 2015/0052352 A1 | 2/2015 | Dolev et al. | |
| 2015/0179062 A1 | 6/2015 | Ralston et al. | |
| 2015/0195827 A1* | 7/2015 | Feng | H04W 72/51 |
| | | | 455/552.1 |
| 2015/0317847 A1 | 11/2015 | Prakah-Asante | |
| 2016/0132705 A1 | 5/2016 | Kovarik et al. | |
| 2016/0135054 A1 | 5/2016 | Maise | |
| 2016/0321924 A1* | 11/2016 | Lewis | B60W 40/109 |
| 2017/0084175 A1* | 3/2017 | Sedlik | H04B 1/3822 |
| 2017/0107090 A1 | 4/2017 | Mondal | |
| 2017/0124864 A1* | 5/2017 | Popple | G08G 1/096783 |
| 2017/0243485 A1 | 8/2017 | Rubin | |
| 2017/0277960 A1* | 9/2017 | Ramasamy | G06V 20/588 |
| 2017/0338956 A1* | 11/2017 | Badawy | H04W 12/033 |
| 2018/0006810 A1 | 1/2018 | Ideguchi et al. | |
| 2018/0027600 A1* | 1/2018 | Lawlis | H04W 12/02 |
| | | | 713/168 |
| 2018/0033301 A1 | 2/2018 | Riou et al. | |
| 2018/0126976 A1 | 5/2018 | Naserian | |
| 2018/0158324 A1 | 6/2018 | Benhammou et al. | |
| 2018/0249525 A1* | 8/2018 | Brahmi | G08G 1/161 |
| 2018/0335781 A1 | 11/2018 | Chase | |
| 2019/0051158 A1* | 2/2019 | Felip Leon | G08G 1/22 |
| 2019/0068434 A1* | 2/2019 | Moreira Da Mota | H04L 41/40 |
| 2019/0120964 A1 | 4/2019 | Luo | |
| 2019/0184993 A1* | 6/2019 | Wigard | B60W 30/16 |
| 2019/0190703 A1 | 6/2019 | Lekkas | |
| 2019/0228238 A1* | 7/2019 | Harada | G06V 20/58 |
| 2019/0335304 A1* | 10/2019 | Yabuuchi | H04W 4/44 |

FOREIGN PATENT DOCUMENTS

| | | | | |
|---|---|---|---|---|
| CN | 108027990 A | * | 5/2018 | ............ B60W 30/08 |
| CN | 108780604 A | * | 11/2018 | ............ B60W 40/04 |
| DE | 102015217793 A1 | * | 3/2017 | ........... G08G 1/0112 |
| EP | 1933291 A1 | * | 6/2008 | ........... G08G 1/0965 |
| JP | 2004020272 A | * | 1/2004 | |
| JP | 2008060789 A | * | 3/2008 | |
| JP | 201358140 A | | 3/2013 | |
| JP | 2014010807 A | * | 1/2014 | |
| JP | 6152653 B2 | | 6/2017 | |
| JP | 6799984 B2 | * | 12/2020 | |
| WO | WO-2010031839 A1 | * | 3/2010 | ............ G07C 5/008 |
| WO | WO-2017017114 A1 | * | 2/2017 | ........... B60R 25/102 |
| WO | WO-2017045780 A1 | * | 3/2017 | |
| WO | WO-2017194533 A1 | * | 11/2017 | ............. G01C 21/14 |
| WO | WO-2018100661 A1 | * | 6/2018 | ......... G01C 21/3492 |

OTHER PUBLICATIONS

Paul England, Andrey Marochko, Dennis Mattoon, Rob Spiger, Stefan Thom and David Wooten; (RIoT—A Foundation for Trust in the Internet of Things); Microsoft Corporation; pp. 19; Apr. 2016.*
Extended European Search Report from related European Patent Application No. 19834346.9, dated Feb. 16, 2022, 11 pages.
Happich, "RFID Sensor Tags to Monitor Road Conditions", Feb. 16, 2015, (1 pg.), eeNews Europe, dated Feb. 16, 2015, retrieved from http://www.eenewseurope.com/news/rfid-sensor-tags-monitor-road-conditions.
U.S. Appl. No. 15/993,119, entitled, "Transmission of Vehicle Route Information By Passive Devices," filed May 30, 2018, (25 pgs.).
International Search Report and Written Opinion from related International application No. PCT/US2019/040444, dated Oct. 25, 2019, 15 pages.
Paul England, et al., "RioT—A Foundation for Trust in the INternet of Things", Microsoft Corporation, MSR-TR-2016-18, Apr. 2016, 19 pages.
A. Bazzi, et al., "Vehicle-to-Vehicle and Vehicle-to-Roadside Multi-Hop Communications for Vehicular Sensor Networks: Simulations and Field Trial", Oct. 31, 2013, 6 pages.
Levente Buttyan, et al., "Secure Vehicular Communication Systems: Design and Architecture", Budapest University of Technology and Economics, Nov. 2008, 10 pages.

(56) References Cited

OTHER PUBLICATIONS

Van Stojmenovic, et al., "The Fog Computing Paradigm: Scenarios and Security Issues", 2014, 8 pages.

Chun-Ta Li, et al., "A Secure and Efficient Communication Scheme With Authenticated Key Establishment And Privacy Preserving for Vehicular Ad Hoc Networks", Dec. 23, 2007, 12 pages.

Bilal Ghazal, et al., "Smart Traffic Light Control System", 2016, 6 pages.

Nasser Al-Ostath, et al., "Implementation of an Emergency Vehicle to Traffic Lights Communication System", 2015, 5 pages.

\* cited by examiner

SECURE VEHICULAR COMMUNICATION

PRIORITY INFORMATION

This application is a Continuation of U.S. application Ser. No. 16/034,763, filed on Jul. 13, 2018, which will issue as U.S. Pat. No. 11,050,556, on Jun. 29, 2021, the contents of which are incorporated herein by reference.

TECHNICAL FIELD

The present disclosure relates generally to apparatuses and methods related to vehicles, and more particularly, to secure vehicular communication.

BACKGROUND

Motor vehicles, such as autonomous and/or non-autonomous vehicles, (e.g., automobiles, cars, trucks, buses, etc.) can use sensors and/or cameras to obtain information about their surroundings to operate safely. For example, autonomous vehicles can control their speed and/or direction and can recognize and/or avoid obstacles and/or hazards based on information obtained from sensors and/or cameras. For example, vehicles may use light detection and ranging (LIDAR), vehicle-to-everything (V2X), RADAR, and/or SONAR detection techniques, among others, to obtain information about their surroundings. As used herein, an autonomous vehicle can be a vehicle in which at least a portion of the decision-making and/or control over vehicle operations is controlled by computer hardware and/or software/firmware, as opposed to a human operator. For example, an autonomous vehicle can be a driverless vehicle.

DETAILED DESCRIPTION

Secure vehicular communication is described herein. Embodiments of the present disclosure can include a processor and a vehicular communication component that can be coupled to the processor. The vehicular communication component can be configured to generate a vehicular private key and a vehicular public key, provide the vehicular public key to a plurality of external communication components, wherein each respective one of the plurality of external communication components is positioned on a different transportation assistance entity, provide data to at least one of the plurality of external communication components, receive, in response to providing the data, additional data from the at least one of the plurality of external communication components, wherein the additional data is encrypted using the vehicular public key, and decrypt the additional data using the vehicular private key.

In some previous approaches, vehicles have used cameras and sensors to obtain information about their surroundings. However, the operation of these cameras and sensors can depend on weather conditions and can be hampered by inclement weather conditions. External communication components can provide redundancy and/or additional transportation information that can improve vehicle operation, resulting in technological improvements to the vehicle. For example, information provided by the external communication components that can be positioned on a transportation assistance entity can be used if vehicular cameras and/or sensors fail, such as due to weather-related events.

In some previous approaches, vehicles have used sensors, such as vehicle to infrastructure (V2I) sensors, to obtain route information from external communication components along a route, such as overhead radio frequency identification (RFID) readers, cameras, traffic lights, lane markers, streetlights, signage, parking meters, or the like. However, in these previous approaches, the communication between a vehicle and an external communication component can be both public and unsecured. In addition, the communication may not be able to be verified, introducing possible nefarious activity that can negatively affect the performance of the vehicle.

As will be described herein, by introducing a secure form of communication and an ability to accurately identify who is sending and/or receiving transportation information, such information from this nefarious activity can be rejected, avoided, discarded, etc. Public keys can be exchanged and used to encrypt data while private keys, which remain private and exclusive to a single entity, can be used to decrypt data. In this way, those without the private key are prevented from intercepting data and using it for purposes other than initially intended. Further, certificates and signatures can be used to verify identities of a sender of data and insure that data originates from an intended source.

Figure 1:
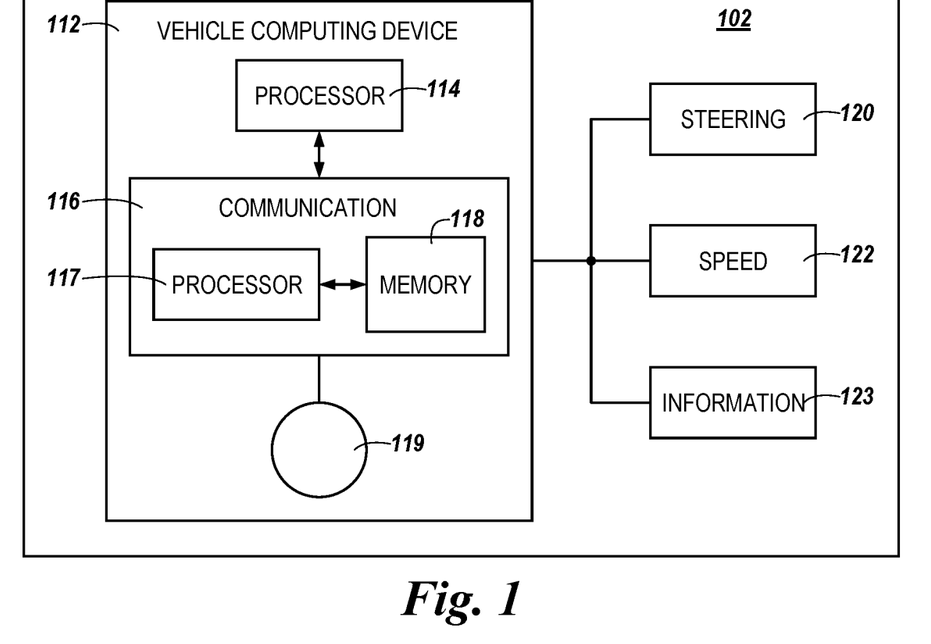
FIG. 1 is a block diagram of an example vehicular entity, in accordance with an embodiment of the present disclosure.

FIG. 1 is a block diagram of an example vehicular entity 102 in accordance with an embodiment of the present disclosure. The vehicular entity 102 can be an autonomous vehicle, a traditional non-autonomous vehicle, an emergency vehicle, a service vehicle, or the like, and that can be referred to as an apparatus. The vehicular entity 102 can include a vehicle computing device 112, such as an on-board computer. Vehicle computing device 112 can include a processor 114 coupled to a vehicular communication component 116, such as a reader, writer, and/or other computing device capable of performing the functions described below, that is coupled to (e.g., or includes) an antenna 119. Vehicular communication component 116 can include a processor 117 coupled to a memory 118, such as a non-volatile flash memory, although embodiments are not so limited.

Vehicle computing device 112 can control operational parameters of vehicular entity 102, such as steering and speed. For example, a controller (not shown) can be coupled to a steering control system 120 and a speed control system 122. Further, vehicle computing device 112 can be coupled to an information system 123. Information system 123 can be configured to display a message, such as the route information, and can display visual warnings and/or output audible warnings.

Figure 2:
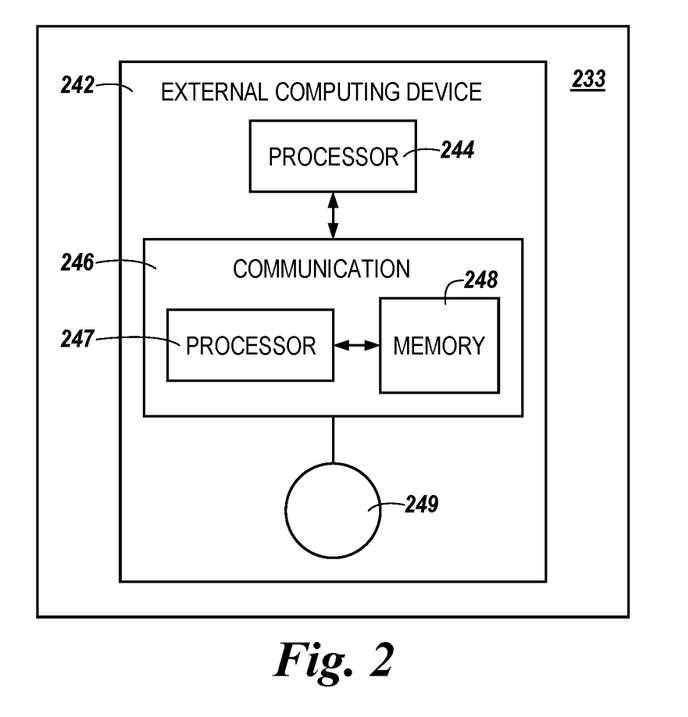
FIG. 2 is a block diagram of an example transportation assistance entity, such as a road or lane including an external communication component, in accordance with an embodiment of the present disclosure.

Communication component 116 can receive route information from additional computing devices, such as from external computing device 233 described in association with FIG. 2. Processor 114 can cause steering control system 120 to adjust the direction of vehicular entity 102 and/or speed control system 122 to adjust the speed of vehicular entity 102 in response (e.g., according) to the route information from communication component 246 in FIG. 2. For example, the route information can indicate the presence of a lane boundary, the presence of a pedestrian, the speed limit, the direction of the road (e.g., the road is straight or curves left or right), that there is a lane change, a detour, or the like. Processor 114 can cause information system 123 to display the route information from communication component 116, such as a distance to a construction zone, a lane change, a crossroad, railroad crossing, or a detour, the presence of a pedestrian, the presence of another vehicle, or the like.

FIG. 2 is a block diagram of an example transportation assistance entity 233, such as a road or lane including an external communication component, in accordance with an embodiment of the present disclosure. The transportation assistance entity 233 can be a road, a road lane, a traffic sign, a street light, an emergency vehicle, a pedestrian, a traffic office, a police officer, etc. The transportation assistance entity 233 can be any element, object, or person capable of having an external communication component positioned, attached, or embedded within or on and able to assist the vehicular entity 102 of FIG. 1.

The transportation assistance entity 233 can include an external computing device 242, such as an on-board computer. External computing device 242 can include a processor 244 coupled to an external communication component 246, such as a reader, writer, and/or other computing device capable of performing the functions described below, that is coupled to (e.g., or includes) an antenna 249. Vehicular communication component 246 can include a processor 247 coupled to a memory 248, such as a non-volatile flash memory, although embodiments are not so limited. The antenna 249 of the external computing device 242 can be in communication with the antenna 119 of the vehicular entity 102.

In some examples, antennas 249 and 119 can be loop antennas configured as inductor coils, such as solenoids. Antenna 119 can loop around vehicular entity 102, for example. Antenna 119 can generate an electromagnetic field in response to current flowing through antenna 119. For example, the strength of the electromagnetic field can depend on the number of coils and the amount of current. The electromagnetic field generated by antenna 119 can induce current flow in an antenna 249 that powers the respective external computing device 242. As an example, antenna 119 in FIG. 1 can induce current flow in antenna 249 when vehicular entity 102 brings antenna 119 to within a communication distance (e.g., a communication range) of the antenna 249. For example, the communication distance can depend on the strength of the electromagnetic field generated by antenna 119. The electromagnetic field generated by antenna 119 can be set, by the number of coils of antenna 119 and/or the current passing through antenna 119, such that the communication distance can span the left and right lanes of a road. In some examples, the communication distance can be about 50 centimeters to about 100 centimeters on either side of vehicular entity 102.

In some examples, the external computing device 242 can include a number of wireless communication devices, such as transmitters, transponders, transceivers, or the like. As an example, the external communication component 246 can be such a wireless communication device. In some examples, wireless communication devices can be passive wireless communication devices that are powered (e.g., energized) by vehicular entity 102, as described above. Wireless communication devices can be located along a route, such as a road, on which vehicular entity 102 can travel. In some examples, the route can include a number of roads. For example, wireless communication devices can be embedded in the roads, embedded and/or located on the walls of a tunnel along the route, located on signs, such as traffic signs, along the route, located in and/or on traffic-control lights along the route, located in and/or on other vehicles along the route, on (e.g., carried by and/or worn by) pedestrians along the route, or the like.

Wireless communication devices can transmit route information about the route to vehicular entity 102 in response to being powered by vehicular entity 102 and/or collect information from vehicular entity 102 in response to being powered by vehicular entity 102. In some examples, route information can include information that can affect the operation of vehicular entity 102 along the route, such as information that can affect the direction and/or the speed of vehicular entity 102 along the route. For example, vehicular entity 102 can make adjustments to its operation and/or indicate that adjustments should be made to its operation in response to the route information.

Wireless communication devices can be short-range wireless communication devices, such as near field communication (NFC) tags, RFID tags, or the like. In at least one embodiment, wireless communication devices can include non-volatile storage components that can be respectively integrated into chips, such as microchips. Each of the respective chips can be coupled to a respective antenna 249. The respective storage components can store respective route information.

In some examples, wireless communication devices can be reprogrammable and can be wirelessly reprogrammed in situ. For example, wireless communication devices can be reprogrammed with updated route information to reflect changes to the road, such as due to road construction, flooding, bridge repairs, detours, lane closures, or the like. For examples in which wireless communication devices are NFC tags, a wireless device with NFC capabilities and application software that allows the device to reprogram the NFC tags can be used to reprogram the NFC tags.

The respective wireless communication devices can respectively transmit their respective route information to communication component 116 in response to vehicular entity 102 passing within the communication distance of the respective wireless communication devices. For example, the respective wireless communication devices can respectively transmit their respective route information in response to being powered by communication component 116. The information can be transferred from wireless communication devices to communication component 116 in the form of signals, such as radio frequency signals. For example, communication devices and communication component 116 can communicate using radio frequency signals.

For examples in which wireless communication devices are NFC tags, communication component 116 can be an NFC reader and can communicate with wireless communication devices using an NFC protocol that can be stored in memory 118 for processing by processor 117. For example, communication component 116 and wireless communication devices can communicate at about 13.56 mega-Hertz according to the ISO/IEC 18000-3 international standard for passive RFID for air interface communications. For example, the information can be transmitted in the form of a signal having a frequency of about 13.56 mega-Hertz.

In some examples, the communication distance may be set such that wireless communication devices are only activated when vehicular entity 102 is too close to wireless communication devices. For example, wireless communication devices can transmit information to communication component 116, indicating that vehicular entity 102 is too close, such as within six inches, one foot, etc. For example, wireless communication devices can be embedded in a road along a centerline and/or an edge of a road and/or located in another vehicle, and the transmitted information can indicate that vehicular entity 102 is too close to the centerline, the edge of the road, or the other vehicle. Communication component 116 can then transmit the information to processor 114. Processor 114 can cause information system 123 to display a visual warning and/or sound an audible alarm, indicating that vehicular entity 102 is too close to the centerline, the edge of the road, or the other vehicle. In some examples, processor 114 can cause steering system 120 to steer vehicular entity 102 away from the centerline, the edge of the road, or the other vehicle in response to the transmitted information.

Wireless communication devices can include information that is specific to and recognized only by particular vehicles that form a particular subset of all the vehicles passing by wireless communication devices, such as emergency vehicles (e.g., police or fire vehicles ambulances, or the like) or service vehicles. In examples where vehicular entity 102 is such a vehicle, communication component 116 can be configured to recognize that information.

In some examples, a wireless communication device can be used to collect information (e.g., traffic information), such as vehicle speeds, the number of vehicles passing by the communication device, or the like. Communication component 116 can be configured to energize a communication device and write the information to the energized communication device. For example, the current vehicle speed and/or a date and time can be written to the communication device. The communication device can collect such information from each vehicle that passes by the communication device. For example, the information can be used to determine the number of vehicles passing by (e.g., the amount of traffic) on a particular day and time and/or the speeds of the vehicles on a particular date and time.

Each of the respective wireless communication devices can include different route information. However, wireless communication devices can be distributed over a relatively short distance of a road, and the route information might change relatively little from wireless communication device to wireless communication device. As such, if a vehicular entity 102 fails to receive information from a wireless communication device, vehicular entity 102 can receive information from another wireless communication device without a significant loss of information. For example, wireless communication devices that are immediately adjacent to each other, with no intervening wireless communication devices, can include the same information so that no information is lost if vehicular entity 102 fails to receive information from one of the wireless communication devices.

Wireless communication devices can be respectively worn or carried by different pedestrians along a road. For example, in response to being energized by communication component 116, wireless communication devices can respectively send messages to communication component 116 indicating the presence of the respective pedestrians.

Figure 3:
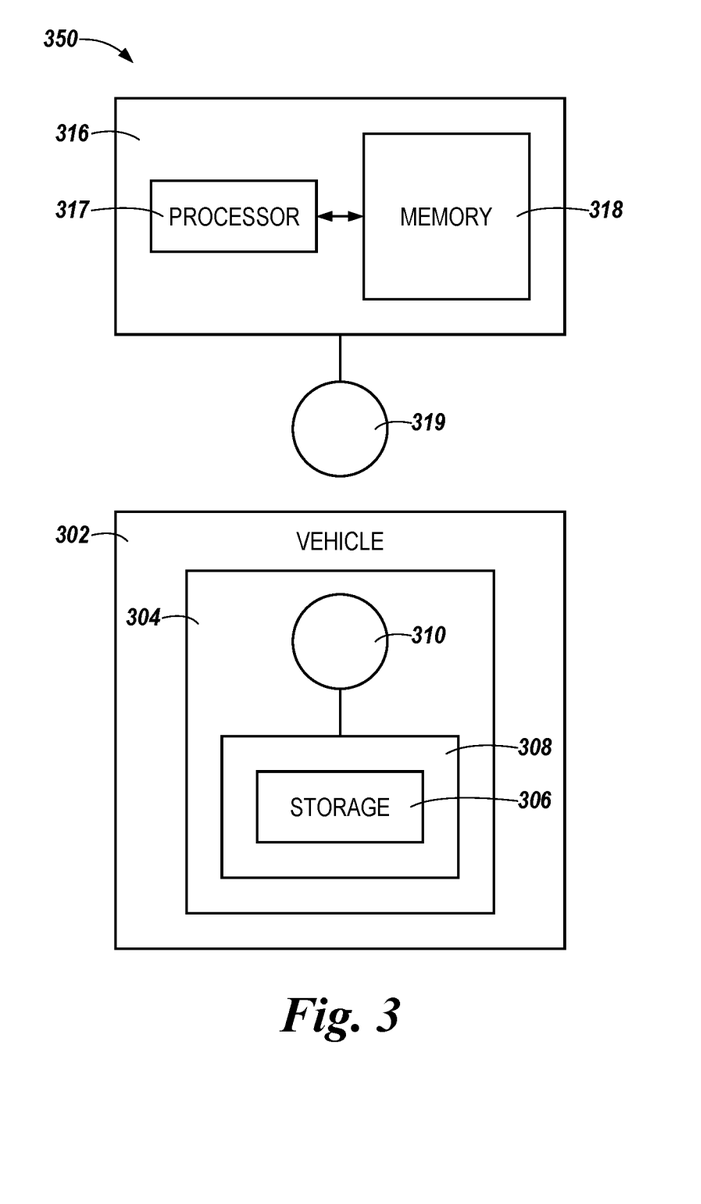
FIG. 3 illustrates an example communications system in accordance with an embodiment of the present disclosure.

FIG. 3 illustrates a communications system 350 in accordance with an embodiment of the present disclosure. System 350 can include a passive wireless communication device, such as a short-range communication device (e.g., an NFC tag 304) that can be as described previously. The NFC tag can be in a vehicular entity 302. Vehicular entity 302 can be configured as shown in FIG. 1 for vehicular entity 102 and include the components of vehicular entity 102 in addition to the NFC tag 304. NFC tag 304 can include a chip 308 having a non-volatile storage component 306 that stores information, such as a user identity information, user financial information for paying a toll, and/or information about vehicular entity 302, such as the speed of vehicular entity 302, the number of passengers in vehicular entity 302, etc. NFC tag 304 can include an antenna 310.

System 350 can include a communications device 316, such an active communications device (e.g., that includes a power supply), that can receive the information from NFC tag 304 and/or can transmit information to vehicular entity 302. In some examples, communications device can include a reader (e.g., an NFC reader), such as a toll reader.

Communications device 316 can include a processor 317 a memory 318, such as a non-volatile memory, and an antenna 319. Memory 318 can include an NFC protocol that allows communications device 316 to communicate with NFC tag 304. For example, communications device 316 and NFC tag 304 can communicate using the NFC protocol, such as at about 13.56 mega-Hertz and according to the ISO/IEC 18000-3 international standard.

Communications device 316 can communicate with an operations center. For example, communications device 316 can be wirelessly coupled or hardwired to the communications center. In some examples, communications device 316 can communicate with the operations center via WIFI or over the Internet. Communications device 316 can energize NFC tag 304 when vehicular entity 302 brings antenna 310 within a communication distance of antenna 319, as described previously. The communication distance can be shorter and can provide better security than previous approaches that use RFID tags.

In some examples, communications device 316 can be a toll reader. For example, NFC tag 304 can transmit user information for paying the toll to communications device 316 in response to being energized by communications device 316. Communications device 316 can then send payment confirmation back to vehicular entity 302, in some instances.

In some examples, communications device 316 can receive real-time information from the operations center and can transmit that information to vehicular entity 302. For example, communications device 316 can transmit road conditions, weather conditions, traffic conditions, etc. to vehicular entity 302. In some examples, a number of communication devices 316 can be embedded in a road along a route of vehicular entity 302, located at an entrance to a bridge, located in or on the walls of a tunnel, located in or on a road signs, traffic signals. For example, communication devices 316 can be located anywhere communication devices 104 and/or 204 can be located, as described previously.

Figure 4:
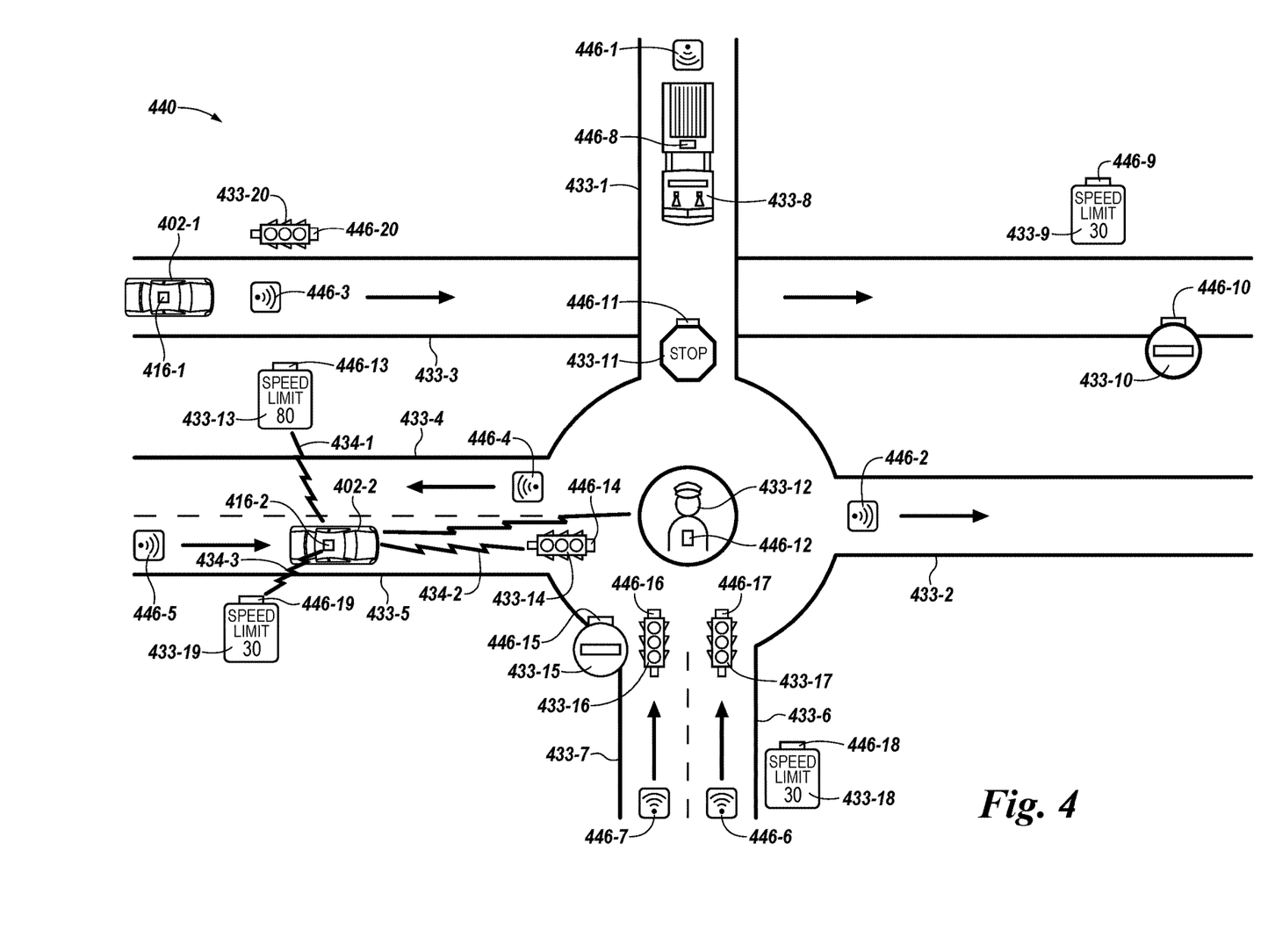
FIG. 4 illustrates an example transportation environment, including transportation assistance entities and vehicular entities, in accordance with an embodiment of the present disclosure.

FIG. 4 illustrates an example transportation environment 440, including transportation assistance entities and vehicular entities, in accordance with an embodiment of the present disclosure. A plurality of external communication components 446-1 to 446-20 (hereinafter referred to collectively as 446) can be embedded within, positioned on, or attached to a plurality of respective transportation assistance entities 433-1 to 433-20 (hereinafter referred to collectively as 433). As an example, an external communication component 446-1 can be embedded within a transportation assistance entity 433-1. As is illustrated, the transportation assistance entity 433-1 is a road lane. Transportation assistance entities 433-1 to 433-7 are road lanes. Transportation assistance entity 433-8 is an emergency fire vehicle. Transportation assistance entities 433-9, 433-13, 433-18, and 433-19 are speed limit traffic signs. Transportation assistance entities 433-10 and 433-15 are do not enter traffic signs and transportation assistance entity 433-11 is a stop traffic sign. Transportation assistance entities 433-14, 433-16, and 433-17 are traffic lights. Transportation assistance entity 433-12 is a traffic controller directing traffic. Each of these transportation assistance entities 433 can have a respective external communication component 446 associated with it. As an example, the traffic controller (transportation assistance entity 433-12) can have an external communication component 446-12 embedded in her uniform and/or within a backpack she is wearing. Embodiments of the present disclosure, however, are not limited to these examples of transportation assistance entities.

A plurality of vehicular entities 402-1 to 402-2 (hereinafter referred to collectively as 402) can each include a respective vehicular communication component 416-1, 416-2 (hereinafter referred to collectively as 416). The vehicular communication components 416 can communicate with a corresponding one of the external communication components 446 when the respective communication component 416 is in particular proximity to the one of the external communication components 446. As an example, as illustrated, vehicular communication component 416-2 is in close proximity to the external communication component 446-13 of transportation assistance entity 433-13 (e.g., speed limit traffic sign) and can therefore communicate, as illustrated by communication signal 434-1, with the respective external communication component 446-13. In one example, close proximity can refer to within 6 inches, within 1 foot, within 2 feet, within 3 feet, no more than 1 meter, within a distance that facilitates a particular strength of communication, etc. It may be beneficial for the communication range (e.g., proximity) to be limited and directional to avoid hacker intrusion during a key sharing process, as described below.

In one example, the vehicular communication component 416-2 can receive data from the external communication component 446-13 using one of WI-FI, Bluetooth™, Code-division multiple access (CDMA), Wideband code-division multiple access (W-CDMA), etc. In addition, the vehicular communication component 416-2 can be a particular proximity to the external communication component 446-14 of transportation assistance entity 433-14 (e.g., traffic light) and can therefore communicate, as illustrated by communication signal 434-2, with the respective external communication component 446-14. The particular proximity in this context can refer to less than or equal to ten meters. In one example, the road infrastructure can be fully connected (e.g., wired, wireless) and, by using a method as described below, can deliver messages to a vehicular entity related to a road status associated with a location that is miles or kilometers ahead. Further, the vehicular communication component 416-2 can be a particular proximity (e.g., less than or equal to ten meters) to the external communication component 446-19 of transportation assistance entity 433-19 (e.g., speed limit traffic sign) and can therefore communicate, as illustrated by communication signal 434-3, with the respective external communication component 446-19. The proximity can be any number of distances that aids in creating a particular communication signal, connection, transmission, etc.

Each of the external communication components 446 can transmit data that corresponds to the type of transportation assistance entity 433 the external communication component is associated with. As an example, the external communication component 446-3 is associated with a transportation assistance entity 433-3 that is a road lane and therefore the external communication component 446-3 can transmit data relating to a road lane such as a road lane identifier, a length of the road lane, a width of the road lane, additional vehicular entities on the road lane, a proximity of vehicular entities to the vehicular communication component 416-1, etc. In response to identifying that data is being received from an external communication component associated with a different road lane than the vehicle is currently on, the received data can be discarded, removed, and/or ignored.

The data transmitted from an external communication component 446 can include a receiver ID (identifying data for all vehicles), Road or Lane ID numbers, Road or Lane ID certificates, a road or lane public key, encrypted data (e.g., vehicular public key), and/or a digital signature of the transportation assistance entity (which can be optional). The digital signature of the transportation assistance entity is generated using an external private key and verified by a vehicular entity using an external public key, as is described in further detail in association with FIGS. 6-8. The data transmitted from a vehicular communication component can include a receiver ID (identifying data for all roads or lanes), a vehicle ID and optionally a VIN, a vehicle ID certificate, a vehicle public key, encrypted data (e.g., an external public key), and/or a digital signature of the vehicular entity (which can be optional). The digital signature of the vehicular entity is generated using a vehicular private key and is verified by an external communication component using a vehicular public key, as is described in further detail in association with FIGS. 6-8.

In response to receiving data from a transportation assistance entity 433 such as an emergency vehicle (e.g., 433-8), the received data can be sent to the controller of the vehicular entity to take further action. Likewise, in response to receiving data from an external communication component related to an alarm event (e.g., a flood, an earthquake, accidents, etc.) the alarm event can be sent to the controller to take further action. In at least one example, all data received from an emergency vehicle and/or a traffic agent can be accepted and managed in a particular way to address a condition that the data may indicate. As an example, in response to the data indicating an accident, the lane or road where the accident occurred can be avoided. As an example, in response to the data indicating traffic congestion, criminal activity, etc., the lane and/or road associated with such data can be avoided. In at least one example, vehicular entities and emergency vehicles can communicate in order to provide easy passage for the emergency vehicle, giving the emergency vehicle priority over other traffic.

As a further example, wireless communication devices, such as external communication components 446, can be embedded in a road along a lane boundary and operate as lane markers that define a lane of a road in which the vehicular entity (e.g., 402-1, 402-2) is traveling. As an example, there can be wireless communication devices on either side of vehicular entity 402-1. In some examples, the wireless communication device defining a lane marker can define the edge of a road, such as adjacent to the shoulder of the road, and can be a center dividing line, dividing the lane from oncoming traffic.

The wireless communication devices can be divided into sets, such as a set of wireless communication devices in which wireless communication devices are contiguous with no gaps therebetween, contiguous for portions with some gaps between, and a combination thereof. Each set of wireless communication devices can provide continuous route information, such as continuous repeated information, to vehicular entity 402-1, for example. Providing repeated information in such a continuous manner, for example, can help overcome issues associated with noise.

The route information in the set of wireless communication devices can indicate that the road is straight, that the road is about to curve, there is an upcoming lane change or a detour, or the like. As an example, wireless communication devices can be distributed across a lane in a direction transverse to the direction of the lane (not shown) and transverse to the direction in which vehicular entity 402-1 is traveling (not shown). Wireless communication devices can be located just before respective crossroads that cross (e.g., intersect) a road, or just after, as illustrated by external communication component 446-4. For example, wireless communication devices can indicate that the respective crossroads are upcoming and/or can indicate the respective distances to the respective crossroads. In at least one embodiment, wireless communication devices can be located before a railroad crossing and can indicate that the railroad crossing is upcoming and/or can indicate the distance to the railroad crossing. In some examples, wireless communication devices can be located in a traffic light and/or a traffic sign, as described above, or can be respectively on different pedestrians in a crosswalk across road.

The communication between the plurality of external communication components 446 and the plurality of vehicular entities 402 can secured (e.g., protected, encrypted, etc.) by transmitting data using particular protocols to protect the transmitted data. As is described further in association with FIGS. 5-9, an example protocol can use a number of private key and public key exchanges in order to protect the data during transmission. In this way, devices trying to send nefarious data or interpret transmitted data can be prevented from doing so without proper authorization. As an example, a public key of a receiving device can be shared with a sending device. The sending device can encrypt data using the public key of the receiving device. The receiving device can receive the encrypted data and decrypt the data using its own private key. Likewise, the receiving device can then encrypt additional data using the sending device's public key and the sending device can receive the encrypted data and decrypt it using its own private key. These public keys can be exchanged in response to the devices being within a particular proximity to each other or some other indication or parameter being met.

Figure 5:
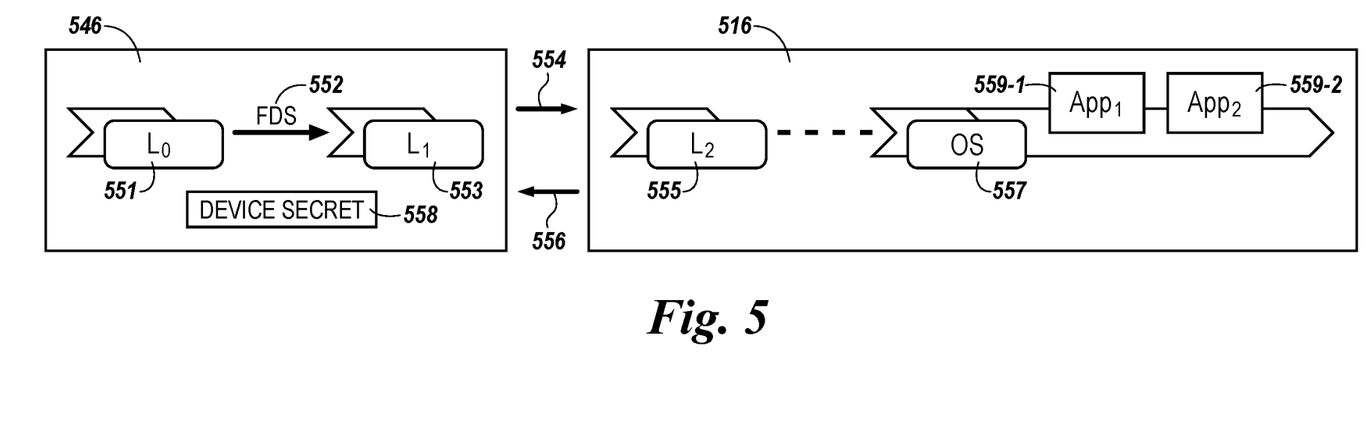
FIG. 5 is a block diagram of an example system including an external communication component and a vehicular communication component in accordance with an embodiment of the present disclosure.

FIG. 5 is a block diagram of an example system including an external communication component 546 and a vehicular communication component 516 in accordance with an embodiment of the present disclosure. As a vehicular entity (e.g., 402 in FIG. 4) comes in close proximity to a road lane (e.g., road lane 433-3), the associated vehicular communication component 516 (e.g., 416-1 in FIG. 4) of the vehicular entity can exchange data with the external communication component 546 of the road lane using a sensor (e.g., a radio frequency identification sensor (RFID)).

A computing device can boot in stages using layers, with each layer authenticating and loading a subsequent layer and providing increasingly sophisticated runtime services at each layer. A layer can be served by a prior layer and serve a subsequent layer, thereby creating an interconnected web of the layers that builds upon lower layers and serves higher order layers. As is illustrated in FIG. 5, Layer 0 ("$L_0$") 551 and Layer 1 ("$L_1$") 553 are within the external communication component. Layer 0 551 can provide a Firmware Derivative Secret (FDS) key 552 to Layer 1 553. The FDS key 552 can describe the identity of code of Layer 1 553 and other security relevant data. In an example, a particular protocol (such as robust internet of things (RIOT) core protocol) can use the FDS 552 to validate code of Layer 1 546 that it loads. In an example, the particular protocol can include a device identification composition engine (DICE) and/or the RIOT core protocol. As an example, an FDS can include Layer 1 firmware image itself, a manifest that cryptographically identifies authorized Layer 1 firmware, a firmware version number of signed firmware in the context of a secure boot implementation, and/or security-critical configuration settings for the device. A device secret 558 can be used to create the FDS 552 and be stored in memory of the external communication component 553.

The external communication component can transmit data, as illustrated by arrow 554, to the vehicular communication component 516. The transmitted data can include an external identification that is public, a certificate (e.g., an external identification certificate), and/or an external public key. Layer 2 ("$L_2$") 555 of the vehicular communication component 516 can receive the transmitted data execute the data in operations of the operating system ("OS") 557 and on a first application 559-1 and a second application 559-2.

In an example operation, the external communication component 546 can read the device secret 558, hash an identity of Layer 1 553, and perform a calculation including:

$$K_{L1} = KDF\ [Fs(s), \text{Hash ("immutable information")}]$$

where $K_{L1}$ is an external public key, KDF (e.g., a KDF as described in NIST (National Institutes of Standards and Technology) Special Publication 800-108) is a key derivation function (i.e., HMAC-SHA256), and Fs(s) is the device secret 558. FDS 552 can be determined by performing:

$$FDS = HMAC\text{-}SHA256\ [\ Fs(s),\ SHA256(\text{"immutable information"})]$$

Likewise, the vehicular communication component 516 can transmit data, as illustrated by arrow 556, including a vehicular identification that is public, a certificate (e.g., a vehicular identification certificate), and/or a vehicular public key. In the case of using an authenticated mode, the vehicular communication component 516 can send a vehicle identification number (VIN) for further authentication, identification, and/or verification of the vehicular entity.

In at least one example, the vehicular entity can log onto the system of the road lane (e.g., log into the external communication component 446-3) using either of an anonymous log in or an authenticated log in. The authentication log in can allow the vehicular entity to obtain additional information that may not be accessible when logging in anonymously in an anonymous mode. In at least one example, the authentication can include providing a vehicular identification number (VIN) and/or authentication information, such as an exchange of public keys, as will be described below. In either of the anonymous and authenticated modes, the road lane can communicate with the vehicular entity to provide the external public key associated with the road lane to the vehicular entity.

Figure 6:
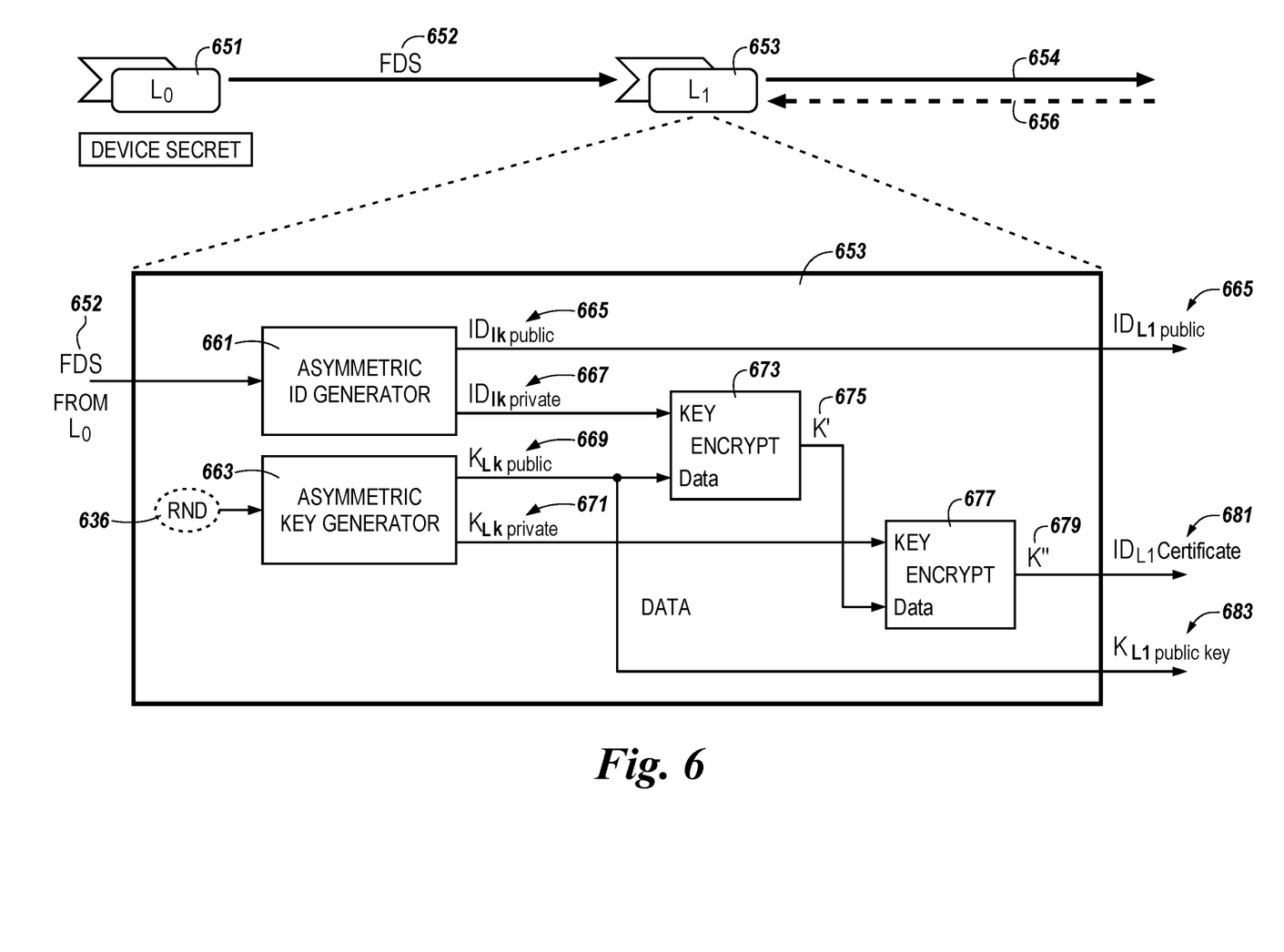
FIG. 6 is a block diagram of an example process to determine a number of parameters in accordance with an embodiment of the present disclosure.

FIG. 6 is a block diagram of an example process to determine a number of parameters in accordance with an embodiment of the present disclosure. FIG. 6 is an example of a determination of the parameters including the external public identification, the external certificate, and the external public key that are then sent, indicated by arrow 654, to Layer 2 (e.g., Layer 2 555) of a vehicular communication component (e.g., 516 in FIG. 5). Layer 0 ("$L_0$") 651 in FIG. 6 corresponds to Layer 0 551 in FIG. 5 and likewise FDS 652 corresponds to FDS 552, Layer 1 653 corresponds to Layer 1 553, and arrows 654 and 656 correspond to arrows 554 and 556, respectively.

The FDS 652 from Layer 0 651 is sent to Layer 1 653 and used by an asymmetric ID generator 661 to generate a public identification ("$ID_{lk\ public}$") 665 and a private identification 667. In the abbreviated "$ID_{lk\ public}$," the "lk" indicates Layer k (in this example Layer 1), and the "public" indicates that the identification is openly shared. The public identification 665 is illustrated as shared by the arrow extending to the right and outside of Layer 1 653 of the external communication component. The generated private identification 667 is used as a key input into an encryptor 673.

Layer 1 653 of an external communication component can include an asymmetric key generator 663. In at least one example, a random number generator (RND) 636 can optionally input a random number into the asymmetric key generator 663. The asymmetric key generator 663 can generate a public key ("$K_{Lk\ public}$") 669 (referred to as an external public key) and a private key ("$K_{LK\ private}$") 671 (referred to as an external private key) associated with an external communication component such as external communication component 546 in FIG. 5. The external public key 669 can be an input (as "data") into the encryptor 673. The encryptor 673 can generate a result K'675 using the inputs of the external private identification 667 and the external public key 669. The external private key 671 and the result K'675 can be input into an additional encryptor 677, resulting in output K" 679. The output K" 679 is the external certificate ("$ID_{L1}$ certificate") 681 transmitted to the Layer 2 (555 of FIG. 5). The external certificate 681 can provide an ability to verify and/or authenticate an origin of data sent from a device. As an example, data sent from the external communication component can be associated with an identity of the external communication component by verifying the certificate, as will be described further in association with FIG. 8. Further, the external public key ("$K_{L1\ public\ key}$") 683 can be transmitted to Layer 2. Therefore, the public identification 665, the certificate 681, and the external public key 683 of an external communication component 633 can be transmitted to Layer 2 of a vehicular communication component.

Figure 7:
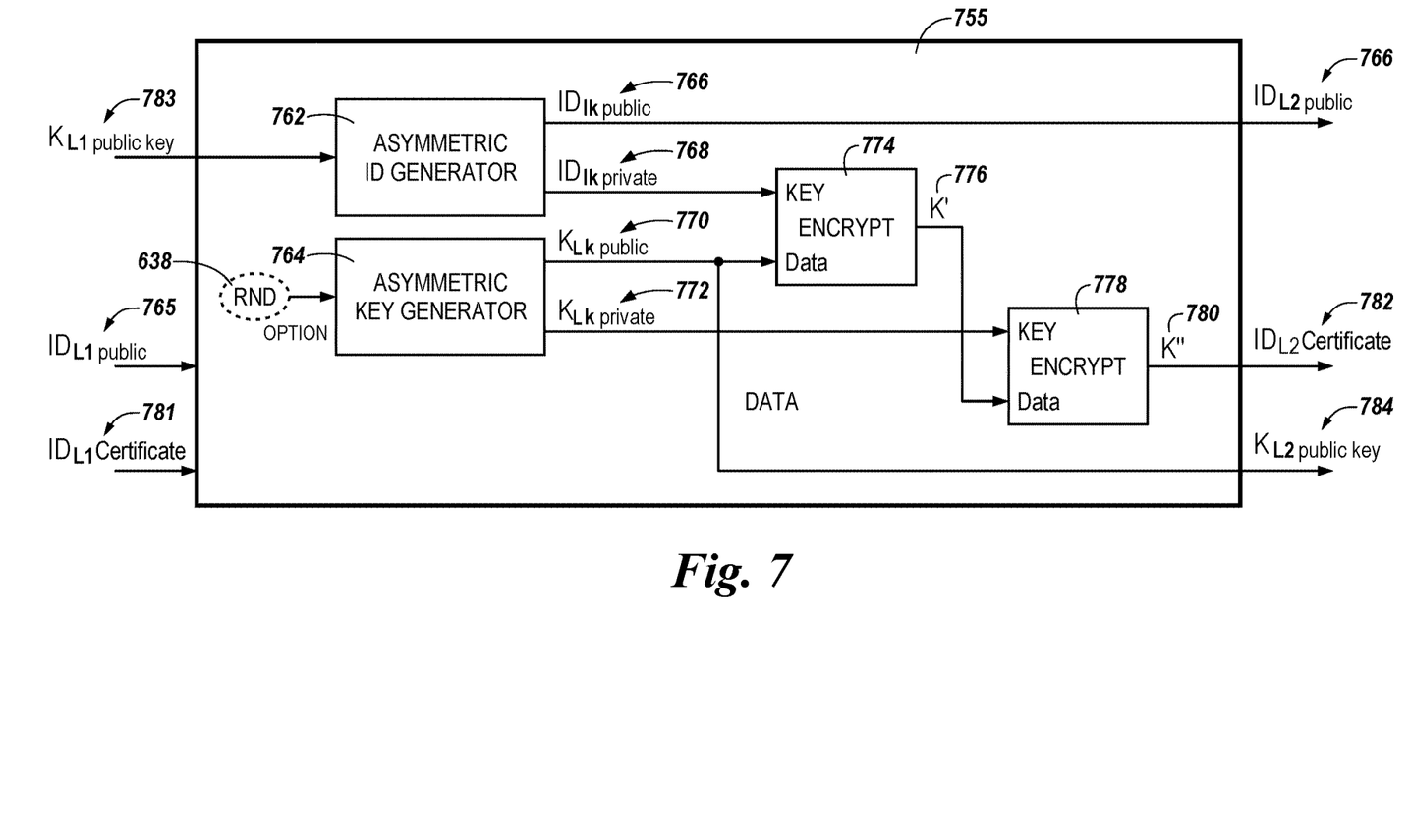
FIG. 7 is a block diagram of an example process to determine a number of parameters in accordance with an embodiment of the present disclosure.

FIG. 7 is a block diagram of an example process to determine a number of parameters in accordance with an embodiment of the present disclosure. FIG. 7 illustrates a Layer 2 755 of a vehicular communication component (e.g., vehicular communication component 516 in FIG. 5) generating a vehicular identification ("$ID_{L2\ public}$") 766, a vehicular certificate ("$ID_{L2}$ Certificate") 782, and a vehicular public key ("$K_{L2\ public\ key}$") 784.

The external public key ("$K_{L1\ public\ key}$") 683 transmitted from Layer 1 of the external communication component to Layer 2 755 of a vehicular communication component, as described in FIG. 6, is used by an asymmetric ID generator 762 of the vehicular communication component to generate a public identification ("$ID_{lk\ public}$") 766 and a private identification 768 of the vehicular communication component. In the abbreviated "$ID_{lk\ public}$," the "lk" indicates Layer k (in this example Layer 2), and the "public" indicates that the identification is openly shared. The public identification 766 is illustrated as shared by the arrow extending to the right and outside Layer 2 755. The generated private identification 768 is used as a key input into an encryptor 774.

Layer 2 755 of the vehicular communication component can include an asymmetric key generator 764. In at least one example, a random number generator (RND) 638 can optionally input a random number into the asymmetric key generator 764. The asymmetric key generator 764 can generate a public key ("$K_{Lk\ public}$") 770 (referred to as a vehicular public key) and a private key ("$K_{LK\ private}$") 772 (referred to as a vehicular private key) associated with a vehicular communication component such as vehicular communication component 516 in FIG. 5. The vehicular public key 770 can be an input (as "data") into the encryptor 774. The encryptor 774 can generate a result K' 776 using the inputs of the vehicular private identification 768 and the vehicular public key 770. The vehicular private key 772 and the result K' 776 can be input into an additional encryptor 778, resulting in output K" 780. The output K" 780 is the vehicular certificate ("$ID_{L2}$ certificate") 782 transmitted back to the Layer 1 (553 of FIG. 5). The vehicular certificate 782 can provide an ability to verify and/or authenticate an origin of data sent from a device. As an example, data sent from the vehicular communication component can be associated with an identity of the vehicular communication component by verifying the certificate, as will be described further in association with FIG. 8. Further, the vehicular public key ("$K_{L2\ public\ key}$") 784 can be transmitted to Layer 1. Therefore, the public identification 766, the certificate 782, and the vehicular public key 784 of the vehicular communication component can be transmitted to Layer 1 of an external communication component.

In an example, in response to an external communication component receiving a public key from a vehicular communication component, the external communication component can encrypt data to be sent to the vehicular communication component using the vehicular public key. Vice versa, the vehicular communication component can encrypt data to be sent to the external communication component using the external public key. In response to the vehicular communication component receiving data encrypted using the vehicular public key, the vehicular communication component can decrypt the data using its own vehicular private key. Likewise, in response to the external communication component receiving data encrypted using the external public key, the external communication component can decrypt the data using its own external private key. As the vehicular private key is not shared with another device outside the vehicular communication component and the external private key is not shared with another device outside the external communication component, the data sent to the vehicular communication component and the external communication component remains secure.

Figure 8:
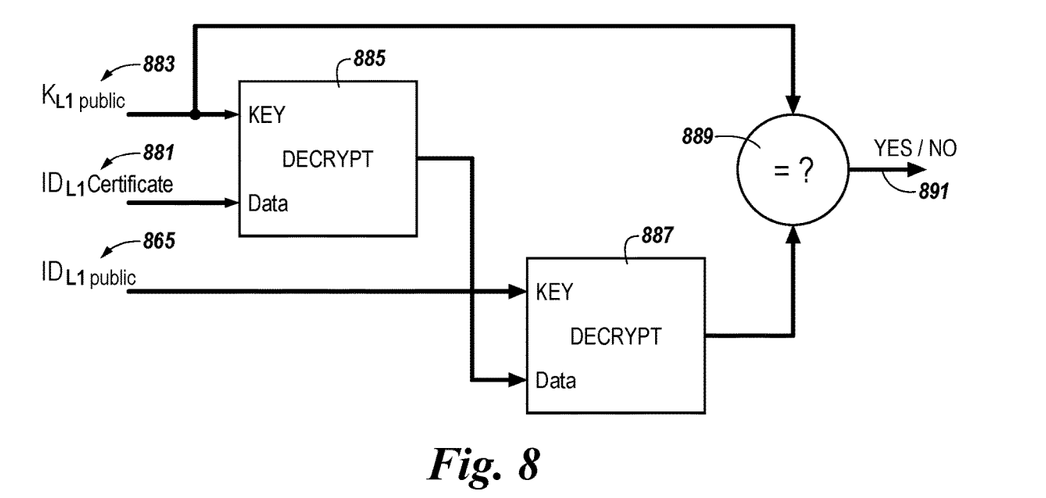
FIG. 8 is a block diagram of an example process to verify a certificate in accordance with an embodiment of the present disclosure.

FIG. 8 is a block diagram of an example process to verify a certificate in accordance with an embodiment of the present disclosure. In the illustrated example of FIG. 8, a public key 883, a certificate 881, and a public identification is provided from an external communication component (e.g., from Layer 1 553 of external communication component 546 in FIG. 5). The data of the certificate 881 and the external public key 883 can be used as inputs into a decryptor 885. The result of the decryption of the certificate 881 and the external public key 883 can be used as an input into a secondary decryptor 887 along with the public identification, result in an output. The external public key 883 and the output from the decryptor 887 can indicate, as illustrated at 889, whether the certificate is verified, resulting in a yes or no 891 as an output. In response to the certificate being verified, data received from the device being verified can be accepted, decrypted, and processed. In response to the certificate not being verified, data received from the device being verified can be discarded, removed, and/or ignored. In this way, nefarious devices sending nefarious data can be detected and avoided. As an example, a hacker sending data to be processed can be identified and the hacking data not processed.

Figure 9:
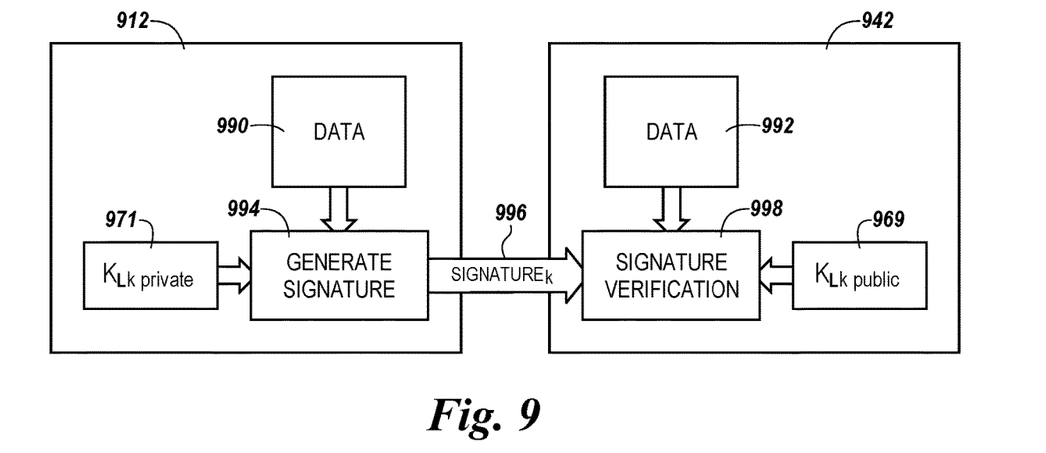
FIG. 9 is a block diagram of an example process to verify a signature in accordance with an embodiment of the present disclosure.

FIG. 9 is a block diagram of an example process to verify a signature in accordance with an embodiment of the present disclosure. In the instance where a device is sending data that may be verified in order to avoid subsequent repudiation, a signature can be generated and sent with data. As an example, a first device may make a request of a second device and once the second device performs the request, the first device may indicate that the first device never made such a request. An anti-repudiation approach, such as using a signature, can avoid repudiation by the first device and insure that the second device can perform the requested task without subsequent difficulty.

A vehicle computing device 912 (such as vehicle computing device 112 in FIG. 1) can send data 990 to an external computing device (such as external computing device 242). The vehicle computing device 912 can generate, at 994, a signature 996 using a vehicular private key 971. The signature 996 can be transmitted to the external computing device 942. The external computing device 942 can verify, at 998, using data 992 and the external public key 969 previously received. In this way, signature verification operates by using a private key to encrypt the signature and a public key to decrypt the signature. In this way, a unique signature for each device can remain private to the device sending the signature while allowing the receiving device to be able to decrypt the signature for verification. This is in contrast to encryption/decryption of the data, which is encrypted by the sending device using the public key of the receiving device and decrypted by the receiving device using the private key of the receiver. In at least one example, the vehicle can verify the digital signature by using an internal cryptography process (e.g., Elliptical Curve Digital signature (ECDSA) or a similar process.

In the preceding detailed description, reference is made to the accompanying drawings that form a part hereof, and in which is shown, by way of illustration, specific examples. In the drawings, like numerals describe substantially similar components throughout the several views. Other examples may be utilized, and structural, logical and/or electrical changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure and should not be taken in a limiting sense.

As used herein, "a," "an," or "a number of" something can refer to one or more of such things. A "plurality" of something intends two or more. As used herein, the term "coupled" may include electrically coupled, directly coupled, and/or directly connected with no intervening elements (e.g., by direct physical contact) or indirectly coupled and/or connected with intervening elements. The term coupled may further include two or more elements that co-operate or interact with each other (e.g., as in a cause and effect relationship).

Although specific examples have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. The scope of one or more examples of the present disclosure should be determined with reference to the appended claims, along with the full range of equivalents to which such claims are entitled.

What is claimed is:

1. An apparatus, comprising:
   a hardware processor; and
   a vehicular communication component, of a vehicular entity, coupled to the hardware processor, wherein the vehicular communication component includes a processor configured to:
   generate a vehicular private key and a vehicular public key;
   provide the vehicular public key to a plurality of external communication components external to the vehicular entity, wherein each respective one of the plurality of external communication components is positioned on a different transportation assistance entity;
   provide data to at least one of the plurality of external communication components;
   receive, in response to providing the data, additional data from the at least one of the plurality of external communication components, wherein the additional data includes data related to an alarm event and is encrypted, wherein the alarm event is a traffic accident;
   receive, in response to providing the data, further additional data from the at least one of the plurality of external communication components, wherein the further additional data includes an identifier of a roadway and is encrypted using the vehicular public key;
   decrypt the further additional data using the vehicular private key;
   determine the roadway is associated with a road lane other than a road lane that the vehicular entity is currently on;
   discard the identifier of the roadway upon determining the roadway is associated with the road lane other than the road lane that the vehicular entity is currently on;

decrypt the additional data using the vehicular private key; and cause the vehicular entity to avoid a lane or road associated with the alarm event, in response to the data indicating the alarm event.

2. The apparatus of claim 1, wherein the processor of the vehicular communication component is further configured to receive an external public key from the at least one of the plurality of external communication components.

3. The apparatus of claim 2, wherein the processor of the vehicular communication component is further configured to encrypt, using the external public key, the data provided to the at least one of the plurality of external communication components.

4. The apparatus of claim 1, wherein one of the different transportation assistance entities on which each respective one of the plurality of external communication components is positioned is an emergency vehicle.

5. The apparatus of claim 1, wherein the processor of the vehicular communication component is configured to provide the vehicular public key to the at least one of the plurality of external communication components, in response to the vehicular communication component being at a particular distance from the at least one of the plurality of external communication components.

6. A method comprising:
generating, by a vehicular entity, a vehicular private key and a vehicular public key;
providing, by the vehicular entity, the vehicular public key to a plurality of external communication components external to the vehicular entity;
encrypting, by the vehicular entity, data using an external public key received from at least one of the plurality of external communication components;
providing, by the vehicular entity, the encrypted data to the at least one of the plurality of external communication components;
receiving, by the vehicular entity, in response to providing the encrypted data, additional data from the at least one of the plurality of external communication components, wherein the additional data includes data related to an alarm event and is encrypted, wherein the alarm event is traffic congestion;
receiving, by the vehicular entity, in response to providing the encrypted data, further additional data from the at least one of the plurality of external communication components, wherein the further additional data includes a length and width of a road lane and is encrypted using the vehicular public key;
decrypting, by the vehicular entity, the further additional data using the vehicular private key;
determining, by the vehicular entity, the road lane is a road lane other than a road lane that the vehicular entity is currently on;
discarding, by the vehicular entity, the length and width of the road lane upon determining the road lane is a road lane other than the road lane that the vehicular entity is currently on;
decrypting, by the vehicular entity, the additional data using the vehicular private key; and
causing the vehicular entity to avoid a lane or road associated with the alarm event, in response to the data indicating the alarm event.

7. The method of claim 6, further comprising: verifying an identity of the at least one of the plurality of external communication components using the decrypted additional data.

8. The method of claim 6, wherein the decrypted additional data comprises a digital signature.

9. The method of claim 6, further comprising: receiving a digital signature from the at least one of the plurality of external communication components; and
verifying the digital signature.

10. The method of claim 9, further comprising: discarding the additional data received from the at least one of the plurality of external communication components in response to determining that the digital signature is unverified.

11. The method of claim 6, wherein the method includes encrypting the data and decrypting the additional data using a device identification composition engine (DICE)-robust internet of thing (RIOT) protocol.

12. An apparatus, comprising:
a hardware processor; and
an external communication component coupled to the hardware processor, wherein the external communication component is external to and remote from a vehicular entity and includes a processor configured to:
receive a vehicular public key from at least one of a plurality of vehicular communication components, wherein each respective one of the plurality of vehicular communication components is coupled to a different vehicle;
encrypt data using the vehicular public key;
provide the encrypted data to the at least one of the plurality of vehicular communication components, wherein the encrypted data includes data related to an alarm event that causes the vehicular entity to avoid a lane or road associated with the alarm event in response to the data indicating the alarm event, wherein the alarm event is a natural disaster; and
provide additional data to the at least one of the plurality of vehicular communication components, wherein the additional data indicates a proximity of the vehicular entity to additional vehicular entities on a road lane and is encrypted using the vehicular public key;
wherein the at least one of the plurality of vehicular communication components, being implemented by one or more processors, is configured to:
decrypt the additional data using a vehicular private key;
determine the road lane is a road lane other than a road lane that the vehicular entity is currently on; and
discard the proximity of the vehicular entity to the additional vehicular entities on the road lane upon determining the road lane is a road lane other than the road lane that the vehicular entity is currently on.

13. The apparatus of claim 12, wherein the processor of the external communication component is further configured to receive, in response to providing the encrypted data, further additional data from the at least one of the plurality of vehicular communication components.

14. The apparatus of claim 13, wherein the processor of the external communication component is further configured to: generate an external private key; and decrypt the further additional data using the external private key.

15. The apparatus of claim 12, wherein the processor of the external communication component is further configured to: generate an external identification; and provide the external identification to the plurality of vehicular communication components.

16. The apparatus of claim 12, wherein the processor of the external communication component is further configured to: generate an external public key; and provide the external public key to the plurality of vehicular communication components.

* * * * *